United States Patent

[11] 3,617,332

[72] Inventor Willi Lehmann
 Murrysville, Pa.
[21] Appl. No. 835,952
[22] Filed June 24, 1969
[45] Patented Nov. 2, 1971
[73] Assignee Westinghouse Electric Corporation
 Pittsburgh, Pa.

[54] METHOD FOR STABILIZING ALKALINE-EARTH METAL SULFIDE PHOSPHORS
 10 Claims, 1 Drawing Fig.
[52] U.S. Cl. .................................................. 117/33.5 C,
 117/100 B, 117/118, 252/301.4 S
[51] Int. Cl. .................................................. H01j 33/20
[50] Field of Search ........................................ 252/301.4
 S, 301.6 S; 117/100 I, 33.5 B, 33.5 CM, 33.5 L,
 118

[56] References Cited
 UNITED STATES PATENTS
 3,264,133 8/1966 Brooks ......................... 117/100 X
 3,435,271 3/1969 Vodoklys ..................... 117/33.5 X

*Primary Examiner*—Alfred L. Leavitt
*Assistant Examiner*—Wayne F. Cyron
*Attorneys*—A. T. Stratton, W. D. Palmer and D. S. Buleza

ABSTRACT: Method for stabilizing finely divided phosphors which have an alkaline-earth metal sulfide matrix wherein the phosphor is exposed to a solution of fluoride compound which reacts with the surface portion of the phosphor. Thereafter, the residual solution is separated from the phosphor. The resulting stabilized phosphor has particular utility for cathodoluminescent application such as cathode-ray tubes, and it can also be used in photoluminescent applications, such as lamps.

PATENTED NOV 2 1971
3,617,332
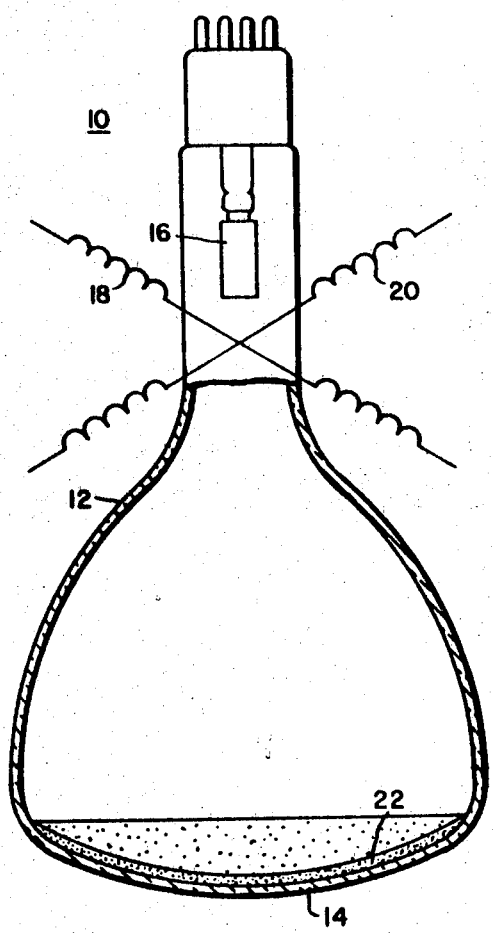
WITNESSES
Bernard R. Gieguay
James H. Young
INVENTOR
Willi Lehmann
BY W. D. Palmer
ATTORNEY

METHOD FOR STABILIZING ALKALINE-EARTH METAL SULFIDE PHOSPHORS

BACKGROUND OF THE INVENTION

Alkaline-earth metal sulfide phosphors are known to be highly efficient cathodoluminescent materials. The use of such phosphors has been severely curtailed, however, by their chemical instability, and such phosphors react with water so that screens made of these phosphors cannot be formed by the usual water-settling techniques. When such phosphors are deposited with an organic vehicle which utilizes an organic binder material, it is necessary to remove the organic binder material by burning out same in high-temperature air. When the alkaline-earth metal sulfide phosphors are exposed to such high-temperature air, their performance is impaired.

The alkaline-earth metal sulfide phosphors include calcium sulfide, strontium sulfide, barium sulfide and magnesium sulfide as well as their solid solutions such as calcium-strontium sulfide, and these sulfides form the phosphor matrix. Depending upon the particular matrix activator which is used, such phosphors display a wide variety of luminescent emissions and other known characteristics which are unsurpassed by any other group of phosphor materials. For cathodoluminescent applications, the energy efficiencies of the alkaline-earth metal sulfide phosphors are equal to the best efficiency levels obtained with other types of phosphors, such as zinc sulfide. This makes these phosphors valuable for a variety of cathodoluminescent applications such as industrial and military cathode-ray tubes, and regular black and white or color TV tubes, etc. The phosphor screens in such tubes are usually made by settling the finely divided or powdered phosphor in an aqueous solution of a soluble alkaline silicate, such as potassium silicate. When the settled phosphor is dry, the silicate acts as a binder to hold the particles in place.

Of the four indicated alkaline-earth metal sulfides, the most stable is calcium sulfide which tolerates a short exposure to water, although a prolonged exposure will cause it to decompose. Magnesium sulfide and barium sulfide are extremely unstable and cannot be exposed to water without rapidly decomposing. The performance of strontium sulfide is about intermediate that of calcium sulfide and magnesium sulfide. Incorporation of an alkaline silicate, such as potassium silicate, improves the stability of the calcium sulfide phosphors, although the more reactive compounds, that is, magnesium sulfide, strontium sulfide and barium sulfide, decompose at a relatively rapid rate despite the presence of the silicate.

If the phosphors are to be deposited with an organic vehicle which incorporates an organic binder, the temperatures required to burn out the organic binder tend to depreciate the phosphor.

SUMMARY OF THE INVENTION

It is the general object of the present invention to provide a method for stabilizing alkaline-earth metal sulfide phosphor.

It is another object to provide a method for stabilizing alkaline-earth metal sulfide phosphor so that the phosphor can be deposited or settled from a water vehicle.

It is a further object to provide a method for stabilizing alkaline-earth metal sulfide phosphor so that the phosphor can be baked in the presence of air, in order to remove an organic binder material, without appreciably depreciating the phosphor.

It is an additional object to provide a vitreous substrate which is coated with a finely divided alkaline-earth metal sulfide phosphor wherein the phosphor has been stabilized either prior to or during the phosphor-coating process.

The foregoing objects of the invention, and other objects which will become apparent as the description proceeds, are achieved by exposing the finely divided alkaline-earth metal sulfide phosphor to a solution of fluoride compound for a predetermined time which is sufficient to permit the fluoride to react with the surface of the finely divided phosphor. Thereafter, the residual solution is separated from the phosphor.

BRIEF DESCRIPTION OF THE DRAWING

For a better understanding of the invention, reference should be made to the sole figure which illustrates a conventional cathode-ray tube, shown partly in section, which incorporates the stabilized phosphor of the present invention.

DESCRIPTION OF THE PREFERRED EMBODIMENTS

There are many known alkaline-earth metal sulfide phosphors and the present method can be used for stabilizing any of these phosphors. As examples, calcium sulfide which is activated by cerium is an excellent green-emitting phosphor. Strontium sulfide activated by manganese is a green emitter as is magnesium sulfide activated by antimony. Calcium sulfide activated by europium is a red-emitting phosphor, and when the calcium sulfide matrix is activated by lead, the phosphor emission is in the ultraviolet. When the calcium sulfide matrix is activated by bismuth, the emission is in the blue. Barium sulfide activated by gold provides an orange emission and magnesium sulfide activated by europium is a yellow emitter. As can be seen from the foregoing, by selection of the sulfide matrix and the activator, practically any emission desired can be obtained.

EXAMPLE I

Calcium sulfide activated by cerium is prepared in conventional fashion and, as an example, the cerium activator is included in the calcium sulfide matrix in amount of approximately 0.1 percent by weight. The prepared, finely divided (powdered) phosphor is placed into an aqueous solution containing about 1 to 5 percent by weight of ammonium fluoride and the phosphor is stirred in the ammonium fluoride solution for approximately 1 minute at about room temperature. Thereafter, the residual solution is decanted, the phosphor is washed with deionized water or alcohol and then dried. As an example, about 50 grams of the phosphor are stirred in about 500 milliliters of the solution.

When the phosphor is mixed in the ammonium fluoride solution, the surface portions of the phosphor react with the fluorine to form a thin protecting film of calcium fluoride, although this film is not thick enough to inhibit the luminescent properties of the prepared phosphor. The resulting phosphor can be settled in water without suffering any depreciation and it can also be coated onto an envelope, such as a fluorescent lamp tube, and exposed after coating to the high-temperature air which is required to bake out an organic binder.

EXAMPLE II

The same cerium-activated calcium sulfide phosphor is mixed with 500 milliliters of methanol which contains from 1 to 5 percent by weight of ammonium fluoride. The phosphor is agitated in a rotary shear homogenizer such as a Waring Blendor for approximately 1 minute at about room temperature. Thereafter the methanol solution of ammonium fluoride is separated from the phosphor, the phosphor is washed in deionized water or methanol, and then dried, and it is then ready for use.

EXAMPLE III

A prepared, finely divided europium-activated magnesium sulfide phosphor is suspended as a slurry in an aqueous solution containing about 1 percent by weight of potassium silicate and 2 percent by weight of ammonium fluoride. The slurry is positioned over and in contact with a vitreous substrate which is to be phosphor coated, such as the faceplate of a cathode-ray tube. The phosphor is exposed to the solution as it settles onto the cathode-ray tube faceplate and after settling, the residual solution is decanted in order to separate it from the coated phosphor. The resulting phosphor displays no depreciation in cathodoluminescence. If the phosphor is settled only with the potassium silicate, or in plain water, it will be completely destroyed in a few minutes.

EXAMPLE IV

A prepared finely divided manganese-activated strontium sulfide is formed as a slurry in an aqueous solution containing 1 percent of potassium silicate and about 2 percent of ammonium fluoride. The phosphor is settled from this slurry onto the cathode-ray tube faceplate and it displays no depreciation in cathodoluminescent brightness. The identical phosphor which is settled from a silicate solution, without the fluoride, displays a cathodoluminescent brightness which is only about 50 to 80 percent of the original and if the same phosphor is settled from a plain water vehicle, it will be completely destroyed. Any of the phosphors as specified can be substituted in any of the foregoing examples.

In accordance with the foregoing examples, the phosphor can be individually stabilized prior to coating or it can be stabilized during the coating process by incorporating the fluoride into the coating slurry. It is preferred to stabilize the phosphor prior to coating same since this facilitates easier washing of the phosphor in order to remove any residual traces of unreacted fluoride. The phosphor can be stabilized by exposing it to an aqueous solution of fluoride compound or alternatively, an alcoholic fluoride compound solution can be utilized. The only limitation on the fluoride compound is that it should be reasonably soluble in the vehicle and for this reason, the preferred fluoride compounds are ammonium fluoride, sodium fluoride, potassium fluoride or lithium fluoride or mixtures thereof. Of these four fluoride compounds, ammonium fluoride is preferred and lithium fluoride is not as effective due to its limited solubility. The concentration of the fluoride compound in the liquid vehicle is not at all critical but preferably is used in amounts of from about 1 percent to 5 percent by weight of the solution. The amount of phosphor which is utilized with respect to the solution is not critical and preferably, the phosphor is present in the solution during the reaction in amounts of from about 5 percent to 25 percent by weight of the solution.

It is normally desirable to incorporate an inorganic binder with the phosphor when it is actually coated, such as for cathode-ray tube application, and a preferred inorganic binder is potassium silicate which is present in amounts of from about 1 percent to 2 percent by weight of the coating vehicle. Sodium silicate can be substituted for the potassium silicate.

The time the phosphor is exposed to the fluoride solution in order to stabilize same is not critical and, as an example, it can vary from about 10 seconds to about 30 minutes, depending upon the solution concentration and the relative reactivity of the phosphor. Preferably the phosphor is reacted in the fluoride solution at about room temperature and the solution temperature appears to have more effect on reaction with the phosphor than the time the phosphor is exposed to the fluoride solution.

With specific reference to the form of the invention illustrated in the sole figure of the drawing, the numeral 10 illustrates a cathode-ray device which is generally of conventional construction and comprises an evacuated envelope 12 including a vitreous light-transmitting faceplate 14. An electron gun 16 is positioned within the neck portion of the envelope 12 and the device is provided with a conventional electron deflecting means, illustrated diagrammatically as deflecting coils 18 and 20. A phosphor screen 22 is positioned between the faceplate 14 and the electron gun 16 and this phosphor screen comprises the activated alkaline-earth metal sulfide matrix phosphor which has been stabilized in accordance with the present invention. It should be clear that the tube 10 as illustrated is shown only in diagrammatic form and that the present stabilized phosphors can be used equally well in a color television tube.

The present phosphor also has application in photoluminescent devices such as lamps. In such a case, it is normally desirable to adhere the phosphor to the vitreous lamp bulb by means of an organic binder material which is dissolved in an organic vehicle or in water to form the phosphor "paint." This binder must be burned out, after the phosphor is applied, by utilizing high-temperature air. A specific example of a suitable organic binder material is disclosed in U.S. Pat. No. 3,303,042, dated Feb. 7, 1967.

It should be clear that as used, the phosphor is normally coated onto a vitreous substrate, and the phosphor has been stabilized against reaction either with water or with high-temperature air by exposing the phosphor, either prior to or during substrate coating of the phosphor, to a solution of fluoride compound for a predetermined time which is sufficient to permit the fluoride to react with the surface of the phosphor, with the residual solution thereafter being separated from the phosphor. As noted hereinbefore, the phosphor can be so stabilized either prior to coating or during the coating process.

It will be recognized that the objects of the invention have been achieved by providing a method for stabilizing alkaline-earth sulfide phosphor so that the phosphor will not react with water during a phosphor-settling process and so that the phosphor will not react with high-temperature air as is used to burn out an organic binder material.

I claim as my invention:

1. The method of stabilizing finely divided phosphor which has an alkaline-earth metal sulfide matrix, which method comprises:
   a. exposing said phosphor to a solution of fluoride compound for a predetermined time sufficient to permit said fluoride to react with the surface of said finely divided phosphor, and
   b. separating residual solution and said phosphor.

2. The method as specified in claim 1, wherein said solution is an aqueous solution, said solution is at about normal room temperature, and said phosphor is exposed to said solution for a period of from about 10 seconds to about 30 minutes.

3. The method as specified in claim 2, wherein said fluoride compound is one or more of ammonium fluoride, sodium fluoride, potassium fluoride, or lithium fluoride.

4. The method as specified in claim 3, wherein said fluoride compound is present in amount of from about 1 percent to 5 percent by weight of said solution.

5. The method as specified in claim 4, wherein said phosphor is present in said solution as a slurry in amount of from about 5 to 25 percent by weight of said solution.

6. The method as specified in claim 5, wherein said phosphor is one of cerium-activated calcium sulfide, manganese-activated strontium sulfide, europium-activated calcium sulfide, lead-activated calcium sulfide, bismuth-activated calcium sulfide, gold-activated barium sulfide, or europium-activated magnesium sulfide.

7. The method as specified in claim 6 wherein said phosphor is initially exposed to said aqueous solution of fluoride compound by being suspended in said solution along with a small amount of inorganic binder material to form a coating slurry, said coating slurry is positioned over and in contact with a vitreous substrate to be phosphor coated, said phosphor is exposed to said solution as it settles therefrom onto said substrate, and after said phosphor has settled onto and coated said substrate, the residual solution is separated from said coated phosphor.

8. The method as specified in claim 7, wherein said inorganic binder material is sodium silicate or potassium silicate in amount of from about 1 percent to 2 percent by weight of said solution.

9. A vitreous substrate which is coated with a finely divided phosphor having an alkaline-earth metal sulfide matrix, said phosphor having been stabilized against reaction either with water or with high-temperature air by exposing said phosphor, either prior to or during substrate coating of same, to a solution of fluoride compound for a predetermined time sufficient to permit said fluoride to react with the surface of said phosphor, and residual solution thereafter being separated from said phosphor.

10. The vitreous substrate as specified in claim 9, wherein said solution of fluoride compound is at about room temperature and contains from 1 percent to 5 percent by weight of said solution of one or more of ammonium fluoride, sodium fluoride, potassium fluoride or lithium fluoride, said phosphor is present as a slurry in said solution in amount of from 5 percent to 25 percent by weight of said solution, and said phosphor is exposed to said solution for about 10 seconds to about 30 minutes.

* * * * *